United States Patent
Wei

(10) Patent No.: US 8,867,597 B2
(45) Date of Patent: Oct. 21, 2014

(54) METHOD, DEVICE AND SYSTEM FOR CLOCK DEJITTER

(75) Inventor: Xiaoyi Wei, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 175 days.

(21) Appl. No.: 13/519,199

(22) PCT Filed: Jun. 22, 2010

(86) PCT No.: PCT/CN2010/074247
§ 371 (c)(1),
(2), (4) Date: Jun. 26, 2012

(87) PCT Pub. No.: WO2010/149028
PCT Pub. Date: Dec. 29, 2010

(65) Prior Publication Data
US 2012/0320960 A1 Dec. 20, 2012

(30) Foreign Application Priority Data
Dec. 30, 2009 (CN) .......................... 2009 1 0239650

(51) Int. Cl.
*H04B 3/46* (2006.01)
*H04J 3/06* (2006.01)

(52) U.S. Cl.
CPC ............... *H04J 3/0685* (2013.01); *H04J 3/062* (2013.01)
USPC ........... 375/226; 375/227; 375/228; 375/229; 375/230; 375/373; 375/375; 375/376

(58) Field of Classification Search
CPC ............... G06F 1/04; G06F 1/10; G06F 1/12; G06F 12/0246; G06F 11/00; G06F 13/1689; G11C 7/222; G11C 29/023; G11C 29/025; G11C 7/1066; G11C 7/1093; G11C 7/22; H03L 7/06; H03L 7/00; H03L 7/08; H04L 27/2626; H04L 27/2647; H04L 1/0041; H04L 1/0045
USPC ......... 375/226, 227, 228, 229, 230, 373, 375, 375/376; 370/241; 379/90.01; 455/67.11, 455/115.1, 226.1; 702/79
See application file for complete search history.

(56) References Cited

U.S. PATENT DOCUMENTS

2004/0001435 A1 * 1/2004 Wong ........................... 370/230

FOREIGN PATENT DOCUMENTS

| CN | 1972160 A | 5/2007 |
|---|---|---|
| CN | 101136628 A | 3/2008 |

OTHER PUBLICATIONS

International Search Report for PCT/CN2010/074247 dated Sep. 8, 2010.

*Primary Examiner* — Dhaval Patel
(74) *Attorney, Agent, or Firm* — Ling Wu; Stephen Yang; Ling and Yang Intellectual Property

(57) ABSTRACT

The present invention discloses a clock dejitter method comprising: a data sending adapter module inputting data with a system clock and using a sending clock to send data; a clock dejitter module associating the system clock with the sending clock of the data sending adapter module using; and the clock dejitter module tracking variations in the system clock and a data enable signal reflecting data sending state by referring to the system clock, and dynamically generating the sending clock varying with the data sending state. The present invention also discloses a clock dejitter apparatus and a data transmission system. The present invention greatly improves the free scheduling processing ability of services and reduces the bit error rate of data transmission while increasing efficiency of large capacity data switch transmission by dynamically adjusting the sending clock.

9 Claims, 2 Drawing Sheets

METHOD, DEVICE AND SYSTEM FOR CLOCK DEJITTER

TECHNICAL FIELD

The present invention relates to the communication field, and more particularly, to a clock dejitter method, apparatus and system for dynamically tracking and adjusting a system clock to generate a sending clock and changing the sending clock with variations in sending services.

BACKGROUND OF THE RELATED ART

With increasing requirements of information technologies and users on services such as multimedia, demands of communication systems on large capacity and free scheduling ability become increasingly high as well.

A good solution for free scheduling requirements of communication systems is the large capacity switch technology, which implements free service scheduling. However, during the free service scheduling, a situation may occur where in the same system device, data signals and their corresponding clock and enable signals are input, and after processed and scheduled by the system, the output data signals cannot use the same clock as the input data signals as the sending clock.

When the input clock of the system device is equal to the output clock, they are generally local data input and local data output, such as ingress A input of No. 1 board, and egress B output of No. 1 board. Such local data scheduling cannot fully meet the free scheduling requirements of the communication systems.

During remote free service scheduling, for example, data is input from ingress A of Beijing No. 1 board and output from egress B of Guangzhou No. 2 board, and a sending clock is required to be generated locally.

Currently, the sending clock is generated at a fixed ratio or by externally connecting a phase lock loop.

In the current method for generating the sending clock, when a sending frequency of service data changes, the generated sending clock no longer matches the data. When the sending frequency of the data changes significantly, that is, when jitter of the corresponding sending clock is relatively large but still within an allowable range of jitter, clock is generated at a fixed ratio such that the data is no longer sent effective and drift of the data is serious, and at the same time, because of mismatch between the sending clock and the sent data, the bit error rate of the sent data of the adapter is increased and frequency locking is difficult. When the sending frequency of the data changes significantly and the jitter of the sending clock has exceeded the allowable range of jitter, the system will not be able to send data at this point.

CONTENT OF THE INVENTION

A main object of the present invention is to provide a clock dejitter method, apparatus and system in which a sending clock is generated dynamically by a system clock.

A technical problem of the present invention is solved by the following technical solution, i.e., a clock dejitter method comprising: an input of a data sending adapter module operating under a system clock and using a sending clock to send data; associating the system clock with the sending clock of the data sending adapter module using a clock dejitter module; and the clock dejitter module tracking variations in the system clock and a data enable signal reflecting data sending state by referring to the system clock, and dynamically generating the sending clock varying with the data sending state.

When beginning to operate, the data sending adapter module uses a clock generated by the dejitter apparatus as the sending clock.

The clock dejitter module comprises a first in first out (FIFO) buffer area and a dejitter controller connected to the FIFO buffer area, wherein the FIFO buffer area reflects a relationship between the sending clock and the system clock, the FIFO buffer area operates under the system clock and uses the data enable signal as a writing enable signal of the FIFO buffer area, and the dejitter controller balances and adjusts fluctuation generated by the data enable signal in the FIFO buffer area based on the system clock so as to dynamically generate a sending clock prototype as an FIFO reading enable signal.

In order to intuitively and truly reflect clock change, the FIFO buffer area is a single bit FIFO buffer area, and the dejitter controller further configures a fluctuation interval parameter indicating whether the FIFO buffer area is balanced and adjusted.

The sending clock prototype generated by the dejitter controller is processed finely by a phase lock loop, a frequency conversion module is provided between the FIFO buffer area and the phase lock loop, and the frequency conversion module adjusts the sending clock prototype to a frequency range acceptable by the phase lock loop.

The present invention also provides a clock dejitter apparatus comprising a data sending adapter module and a clock dejitter module connected to the data sending adapter module and associating a system clock with a sending clock. The data sending adapter module operates under the system clock and uses the sending clock to send data. The clock dejitter module is configured to track variations in a data enable signal reflecting data sending state by referring to the system clock, and dynamically generate the sending clock varying with the data sending state.

The clock dejitter apparatus operates under the system clock upon power-up. Upon power-up, the data sending adapter module uses a clock generated by the clock dejitter module as the sending clock and update dynamically in real time and finally stabilize the sending clock such that data rates at both sides of an adapter are matched.

The present invention also provides a clock dejitter data transmission system comprising a service input and output terminal, a system processing module and a clock dejitter apparatus. The clock dejitter apparatus is configured to track variations in a data enable signal reflecting data sending state by referring to the system clock, and dynamically generate the sending clock varying with the data sending state.

Compared with the prior art, the beneficial effects of the present invention is as follows.

In the clock dejitter method in accordance with the present invention, the clock dejitter module tracks variations in the data enable signal reflecting the data sending state by referring to the system clock, and dynamically generates the sending clock varying with the data sending state, thereby greatly improving the free scheduling processing ability of services, reducing the bit error rate of data transmission, and at the same time increasing efficiency of large capacity data switch transmission. Compared with the prior art, the clock dejitter apparatus in accordance with the present invention can generate the sending clock which tracks variations in service data in real time, remove bit error and failure caused by clock jitter, and be more suitable for actual requirement of free scheduling of the current large capacity switch services, and the dejitter method is more flexible such that the sending performance of the service data is more stable. In the clock dejitter apparatus in accordance with the present invention, the clock dejitter module can operate at any data sending end, therefore, carriers for implementing the dejitter apparatus is more flexible and diverse In the clock dejitter method in accordance with the present invention, the FIFO buffer area operates under the system clock and uses the data enable signal as the writing enable signal of the FIFO buffer area, the dejitter controller balances and adjusts fluctuation generated in the FIFO buffer area by the data enable signal based on the system clock so as to dynamically generate the sending clock prototype as the FIFO reading enable signal such that the sending clock changes with variations in the state of the data sending services and finally stabilizes. The sending clock is generated in real time and accurately based on the system clock.

In the clock dejitter method in accordance with the present invention, the dejitter controller configures the fluctuation interval parameter indicating whether the FIFO buffer area is balanced and adjusted, for example, a 80-bit lower waterline and a 120-bit upper waterline can be configured, and the appropriate configuration of the fluctuation interval parameter enables the dejitter controller to generate the sending clock prototype more accurately in real time.

In the clock dejitter apparatus in accordance with the present invention, the clock dejitter module includes a phase lock loop and a frequency conversion module which process the sending clock prototype finely, and the sending clock is converted by the frequency conversion module to better meet the requirement of input signals of the phase lock loop.

PREFERRED EMBODIMENTS OF THE PRESENT INVENTION

The present invention will be further described in detail below by particular embodiments in conjunction with the accompanying drawings.

The present embodiment relates to a clock dejitter apparatus and method applied in a communication system. The objective is to provide a reliable, automatically adjusted, and purely digitally implemented method and apparatus which can be directly applied to designs of field programmable gate arrays (FPGA) and application specific integrated circuit (ASIC) systems and can be integrated as a chip.

Figure 1:
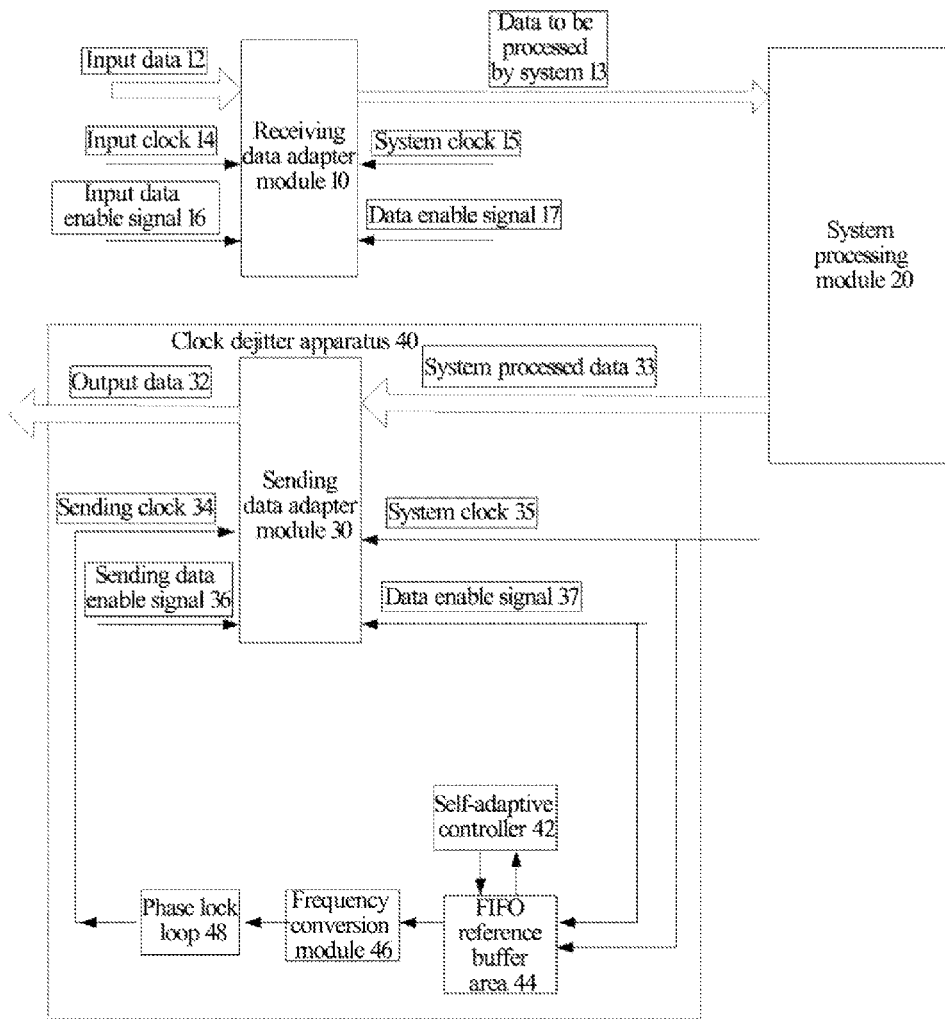
FIG. 1 is a block diagram of a clock dejitter apparatus according to the present embodiment.

Referring to FIG. 1, in general, the clock dejitter solution of the present embodiment is that a data sending adapter module 30 operates under a system clock 35 and uses a sending clock 34 to send data. The data sending adapter module 30 is connected to a clock dejitter module associating the system clock 35 with the sending clock 34. The clock dejitter module tracks variations in a data enable signal reflecting data sending state by referring to the system clock, and dynamically generates the sending clock varying with the data sending state, thereby greatly improving the free scheduling processing ability of services and reducing the bit error rate of data transmission while increasing efficiency of large capacity data switch transmission.

The communication system involved in the present embodiment comprises a receiving data adapter module 10, a system processing module 20, and a sending data adapter module 30. Inputs of the system processing module 20 and sending data adapter module 30 operates under the system clock 35. A clock dejitter module provided on the sending data adapter module 30 is added to the communication system. The system can activate the clock dejitter module by a switch circuit (not shown) or direct power-up.

The receiving data adapter module 10 receives input data 12, along with an input clock 14 and an input data enable signal 16. Data to be processed by system 13 of the receiving data adapter module 10 is connected to the system processing module 20. The receiving data adapter module 10 operates under the system clock 15 and is controlled by a data enable signal 17 of the system.

The clock dejitter apparatus 40 in accordance with the present embodiment comprises a clock dejitter module connected to the sending data adapter module 30. The sending data adapter module 30 sends the system processed data 33 to a target system. At the same time, an input side of the sending data adapter module 30 is connected to the system clock 35 and a data enable signal 37 of the system, and its output side sends output data 32 and is connected to a sending data enable signal 36 adjusted with data bit width and the sending clock 34 generated by the clock dejitter apparatus.

During local service transmission, for example, data is input via ingress A of No. 1 board, and is output via egress B of No. 1 board. When the data input, output and the system processing module 20 are the same device, the data enable signal 16 and the data enable signal 36 can be identical. However, during remote service scheduling, for example, the data is input via ingress A of Beijing No. 1 board and output via egress B of Guangzhou No. 1 board. When the data input, output and the system processing module 20 are not the same device, the data enable signal 16 and the data enable signal 36 are different.

The clock dejitter module includes an FIFO buffer area 44 reflecting the relationship between the sending clock and the system clock, a dejitter controller 42 connected to the FIFO buffer area 44, a frequency conversion module 46, and a phase lock loop (PLL) 48.

The FIFO buffer area is a single bit FIFO buffer area intuitively reflecting clock change. The dejitter controller 42 configures a fluctuation interval parameter indicating whether the FIFO buffer area is balanced and adjusted. The fluctuation interval parameter is ensured by an upper waterline and a lower waterline of the single bit FIFO buffer area. The upper waterline and lower waterline define a fluctuation interval of a single column of bit signals. The dejitter controller 42 controls the single column of bit signals in the FIFO reference area 44 within the fluctuation interval in a balancing and adjusting way, and then acquires a sending clock prototype as a reading enable signal of the FIFO reference area 44. The sending clock module is used as the sending clock 34 for sending data after adjusted by the frequency conversion module 46 and processed finely by the phase lock loop 48.

In this example, the lower waterline and upper waterline are 80-bit and 120-bit respectively and are required to be configured reasonably. If the interval is too narrow, such as 80-81 bits, then it is easy to be read through or overwritten such that the relationship between the sending clock 34 and the system clock 35 cannot be reflected factually and the dejitter apparatus cannot operate; and if the interval is too wide, such as 20-100 bits, then for a small fluctuation, the FIFO reference area 44 cannot reflect timely and accurately variations in jitter to make adjustment timely, thus the dejitter apparatus is meaningless.

The FIFO reference area 44 operates under the system clock 35 and uses the data enable signal 37 as a writing enable signal of the FIFO reference area 44. The dejitter controller 42 dynamically generates a sending clock prototype as a reading enable signal of the FIFO reference area 44 based on the system clock 35 by tracking variations in the data enable signal 37 reflecting service features.

The frequency conversion module 46 is provided between the FIFO buffer area 44 and the phase lock loop 48. A clock signal restored by the FIFO reference area 44 is input into the phase lock loop 48 via the frequency conversion module 46. The phase lock loop 48 is used for processing the sending clock prototype finely. In this example, what is input into the phase lock loop 48 is a clock signal with a fixed frequency converted by the frequency conversion module 46. When different phase lock loops are used, the clock signal input into the phase lock loop can be adjusted according to the operating requirement of the phase lock loop, for example, the clock signal restored from the reading enable signal of the FIFO reference area is 50 MHz, and the requirement of the phase lock loop for the input signal is 2-20 MHz, then at this point the frequency conversion module 44 is required to lower the restored clock signal to the input signal range specified by the phase lock loop 48.

When starting to operate, the data sending adapter module 30 uses a clock generated by the clock dejitter module as the sending clock and update dynamically in real time and finally stabilize the sending clock such that data rates at both sides of an adapter are matched.

Figure 2:
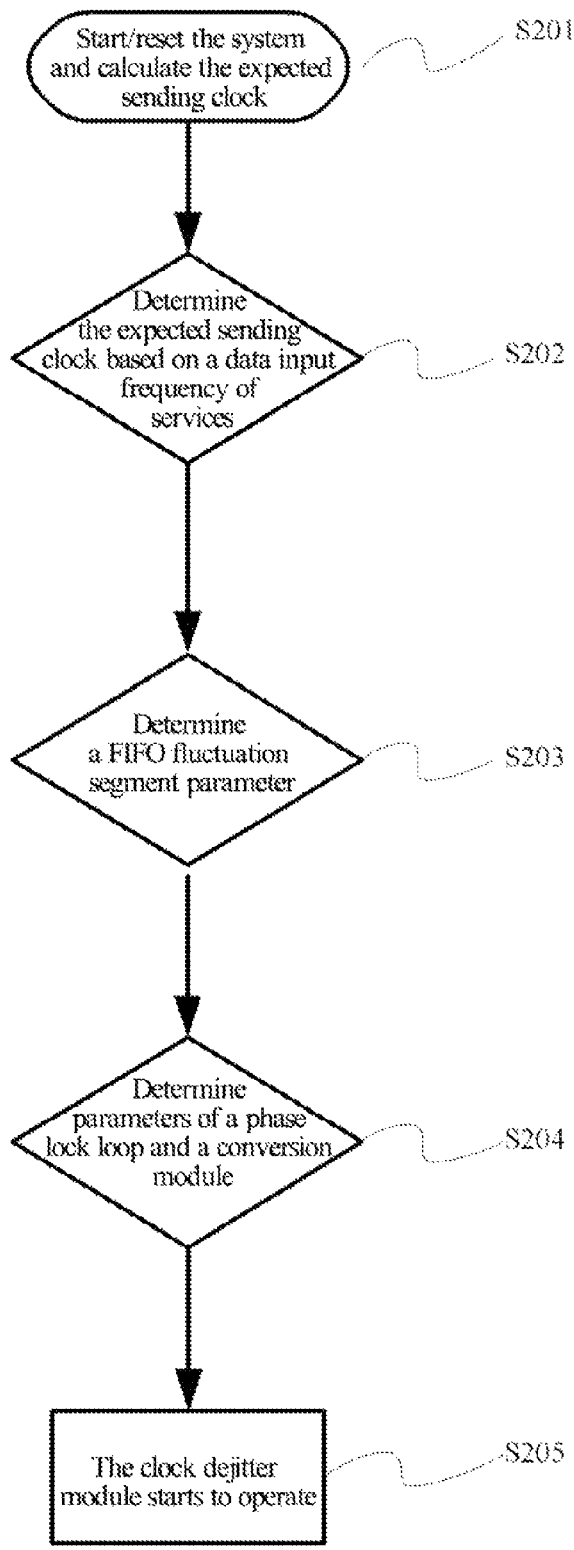
FIG. 2 shows a flowchart of a procedure of generation of an expected sending clock of a clock dejitter apparatus according to the present embodiment.

FIG. 2 shows processing steps of a clock dejitter apparatus according to the present embodiment.

In S201, the system is started/reset, and the clock dejitter apparatus and system are activated simultaneously to start to operate.

In S202, the expected sending clock is determined based on a data input frequency of services. Specifically, the system provides the required data signals to a sending data adapter module 30, which sends output data 32 to a target system, while the system calculates the expected sending clock based on the I/O relationship of the services.

In S203, a fluctuation interval parameter of a FIFO reference area 44 is determined. In the embodiment, the fluctuation interval parameter is ensured by an upper waterline and lower waterline of a single bit FIFO buffer area, which define a fluctuation interval monitored by a dejitter controller in a balancing and adjusting way. In this example, the lower waterline and upper line may be 80 bit and 120 bit respectively. The FIFO reference area operates under the system clock and uses a data enable signal 37 as a writing enable signal of the FIFO reference area 44. A dejitter controller 42 dynamically generates a sending clock prototype as a reading enable signal of the FIFO reference area 44 based on a system clock 35 by tracking variations in the data enable signal 37 reflecting service features.

In S204, a frequency division parameter of a frequency conversion module is determined according to the performance and requirement of a phase lock loop (PLL). In this example, what is input into the phase lock loop 48 is a clock signal with a fixed frequency converted by the frequency conversion module 46. When different phase lock loops are used, the clock signal input into the phase lock loop can be adjusted according to the operating requirement of the phase lock loop, for example, the clock signal restored from the reading enable signal of the FIFO reference area is 50 MHz, and the requirement of the phase lock loop for the input signal is 2-20 MHz, then at this point the frequency conversion module 44 is required to lower the restored clock signal to the input signal range specified by the phase lock loop 48.

In S205, the clock dejitter apparatus starts to dynamically adjust the sending clock 34 according to the data sending state and update dynamically in real time and finally stabilize the sending clock such that data rates at both sides of an adapter are matched. As an embodiment, the dejitter apparatus can be activated by a switch circuit (not shown) or direct power-up.

By now, the clock dejitter clock starts to operate normally and dynamically adjust the sending clock in real time.

In this example, the dejitter controller 42 balances and adjusts a single column of bit streams in the FIFO buffer area 44 to be within the fluctuation interval. The bit streams buffered in the FIFO buffer area 44 and ordered in a manner of single bit are the result of interaction of the system clock 35 and the data enable signal 37. At the same time, a sending clock prototype is restored from the FIFO reading enable signal, therefore, the FIFO reference area 44 is subject to interaction of the system clock 35, the data enable signal 37, the sending clock 34 and the sending enable signal 36. When the rate of the data 35 input into the adapter becomes high, the rate of the corresponding data enable signal 37 will become high as well, i.e. the writing enable rate of the FIFO buffer area 44 is increased such that the FIFO buffer area begin tending to be overwritten. In order to balance the overwritten state, the dejitter controller 42 is required to speed up the FIFO reading enable signal as the sending clock prototype, i.e. dynamically increase the frequency of the sending clock 34.

When the rate of the data 35 input into the adapter becomes lower, the rate of the corresponding data enable signal 37 will become lower as well, i.e. the writing enable frequency of the FIFO buffer area 44 is decreased, at this point the sending clock 34 remains in a non-declining state such that the FIFO buffer area begin tending to be read through. In order to balance the read-through state, the dejitter controller 42 is required to slow down the FIFO reading enable signal as the sending clock prototype, i.e. dynamically decrease the frequency of the sending clock 34.

The present embodiments also relates to a clock dejitter method, which has been already embodied in the introduction of the apparatus and system.

The above content is further detailed description made to the present invention in conjunction with particular embodiments, and the specific implementation of the present invention is not limited thereto. Various simple deductions or substitutions which may be made by those skilled in the art without departing from the concept of the present invention should be considered to be within the scope of protection of the present invention.

It may be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

INDUSTRIAL APPLICABILITY

The present invention greatly improves the free scheduling processing ability of services and reduces the bit error rate of data transmission while increasing efficiency of large capacity data switch transmission by dynamically adjusting the sending clock.

What I claim is:

1. A clock dejitter method comprising:
operating, by an input of a data sending adapter module, under a system clock and using a sending clock to send data;
associating the system clock with the sending clock of the data sending adapter module using a clock dejitter module; and
tracking variations, by the clock dejitter module, in a data enable signal reflecting data sending state by referring to the system clock, and dynamically generating the sending clock varying with the data sending state;
wherein the data sending adapter module uses a clock generated by the clock dejitter module as the sending clock upon initialization, and the sending clock is updated dynamically in real time and finally stabilized by the clock dejitter module such that data rates at both sides of an adapter are matched;
wherein the clock dejitter module comprises a first in first out (FIFO) buffer area and a dejitter controller connected to the FIFO buffer area, the FIFO buffer area reflects a relationship between the sending clock and the system clock, the FIFO buffer area operates under the system clock and uses the data enable signal as a writing enable signal of the FIFO buffer area, and the dejitter controller balances and adjusts fluctuation generated by the data enable signal in the FIFO buffer area based on the system clock so as to dynamically generate a sending clock prototype as an FIFO reading enable signal.

2. The clock dejitter method according to claim 1, wherein the FIFO buffer area is a single bit FIFO buffer area which intuitively and truly reflects clock change, and the dejitter controller further configures a fluctuation interval parameter indicating whether the FIFO buffer area should be balanced and adjusted.

3. The clock dejitter method according to claim 1, wherein the step of the clock dejitter module tracking variations in the data enable signal reflecting data sending state by referring to the system clock and dynamically generating the sending clock varying with the data sending state comprises: a phase lock loop processing finely the sending clock prototype generated by the dejitter controller, a frequency conversion module being provided between the FIFO buffer area and the phase lock loop, and the frequency conversion module adjusting the sending clock prototype to a frequency range acceptable by the phase lock loop.

4. A clock dejitter apparatus comprising a data sending adapter module and a clock dejitter module which are implemented in field programmable gate arrays (FPGA) and application specific integrated circuit (ASIC) systems and is integrated as a chip; wherein
the data sending adapter module is configured to operate under a system clock and use a sending clock to send data; and
the clock dejitter module is configured to associate the system clock with the sending clock of the data sending adapter module, track variations in a data enable signal reflecting data sending state by referring to the system clock, and dynamically generate the sending clock varying with the data sending state;
wherein the data sending adapter module is further configured to use a clock generated by the clock dejitter module as the sending clock upon initialization, and the sending clock is updated dynamically in real time and finally stabilized by the clock dejitter module such that data rates at both sides of an adapter are matched;
wherein the clock dejitter module comprises a first in first out (FIFO) buffer area and a dejitter controller connected to the FIFO buffer area,
the FIFO buffer area is configured to reflect a relationship between the sending clock and the system clock, operate under the system clock and use the data enable signal as a writing enable signal of the FIFO buffer area, and
the dejitter controller is configured to balance and adjust fluctuation generated by the data enable signal in the FIFO buffer area based on the system clock so as to dynamically generate a sending clock prototype as an FIFO reading enable signal.

5. The clock dejitter apparatus according to claim 4, wherein the FIFO buffer area is a single bit FIFO buffer area which intuitively and truly reflects clock change, and the dejitter controller is further configured to configure a fluctuation interval parameter indicating whether the FIFO buffer area should be balanced and adjusted.

6. The clock dejitter apparatus according to claim 5, wherein the clock dejitter module further comprises a frequency conversion module and a phase lock loop; the frequency conversion module is configured to adjust the sending clock prototype output by the FIFO buffer area to a frequency range acceptable by the phase lock loop; and the phase lock loop is configured to process finely the sending clock prototype processed by the frequency conversion module.

7. A clock dejitter data transmission system, comprising:
a system processing module and a clock dejitter apparatus, the clock dejitter apparatus comprising a data sending adapter module and a clock dejitter module implemented by hardware; wherein
the system process module is connected to the clock dejitter apparatus;
the data sending adapter module is configured to operate under a system clock and use a sending clock to send data; and
the clock dejitter module is configured to associate thesystem clock with the sending clock of the data sending adapter module, track variations in a data enable signal reflecting data sending state by referring to the system clock, and dynamically generate the sending clock varying with the data sending state;
wherein the data sending adapter module is further configured to use a clock generated by the clock dejitter module as the sending clock upon initialization, and the sending clock is updated dynamically in real time and finally stabilized by the clock dejitter module such that data rates at both sides of an adapter are matched;
wherein the clock dejitter module comprises a first in first out (FIFO) buffer area and a dejitter controller connected to the FIFO buffer area,
the FIFO buffer area is configured to reflect a relationship between the sending clock and the system clock, operate under the system clock and use the data enable signal as a writing enable signal of the FIFO buffer area, and
the dejitter controller is configured to balance and adjust fluctuation generated by the data enable signal in the FIFO buffer area based on the system clock so as to dynamically generate a sending clock prototype as an FIFO reading enable signal.

8. The clock dejitter data transmission system according to claim 7, wherein the FIFO buffer area is a single bit FIFO buffer area which intuitively and truly reflects clock change, and the dejitter controller is further configured to configure a fluctuation interval parameter indicating whether the FIFO buffer area should be balanced and adjusted.

9. The clock dejitter data transmission system according to claim 8, wherein the clock dejitter module further comprises a frequency conversion module and a phase lock loop; the frequency conversion module is configured to adjust the sending clock prototype output by the FIFO buffer area to a frequency range acceptable by the phase lock loop; and the phase lock loop is configured to process finely the sending clock prototype processed by the frequency conversion module.

\* \* \* \* \*